United States Patent [15] 3,681,696
Epstein [45] Aug. 1, 1972

[54] TELEMETERING APPARATUS

[72] Inventor: Philip L. Epstein, West Caldwell, N.J.

[73] Assignee: Quindar Electronics, Inc., Springfield, N.J.

[22] Filed: Sept. 25, 1970

[21] Appl. No.: 75,774

Related U.S. Application Data

[63] Continuation of Ser. No. 867,953, Oct. 20, 1969, abandoned, which is a continuation of Ser. No. 540,549, April 6, 1966, abandoned.

[52] U.S. Cl. .....................325/320, 178/88, 325/475
[51] Int. Cl. .............................................H04l 27/14
[58] Field of Search........325/30, 320, 474, 475, 479; 178/66, 88

[56] References Cited

UNITED STATES PATENTS

| | | | |
|---|---|---|---|
| 2,252,066 | 8/1941 | Dallos | 325/474 |
| 2,999,925 | 9/1961 | Thomas | 325/474 |
| 3,387,222 | 6/1968 | Hellwarth et al. | 325/474 |
| 3,479,597 | 11/1969 | Mack | 178/88 |

*Primary Examiner*—Robert L. Griffin
*Assistant Examiner*—Peter M. Pecori
*Attorney*—Morse, Altman and Oates

[57] ABSTRACT

In a telemetering system, a receiver is provided with mark and space channels which are interrelated electronically by applying to the so-called threshold of each channel a control signal that represents an average of the intensities of the mark and space input signals. An advantage of the foregoing circuitry is noise immunity, which results from raising or lowering the thresholds of both frequency channels in response to noise generated at any place in the system.

3 Claims, 2 Drawing Figures

Figure 1:
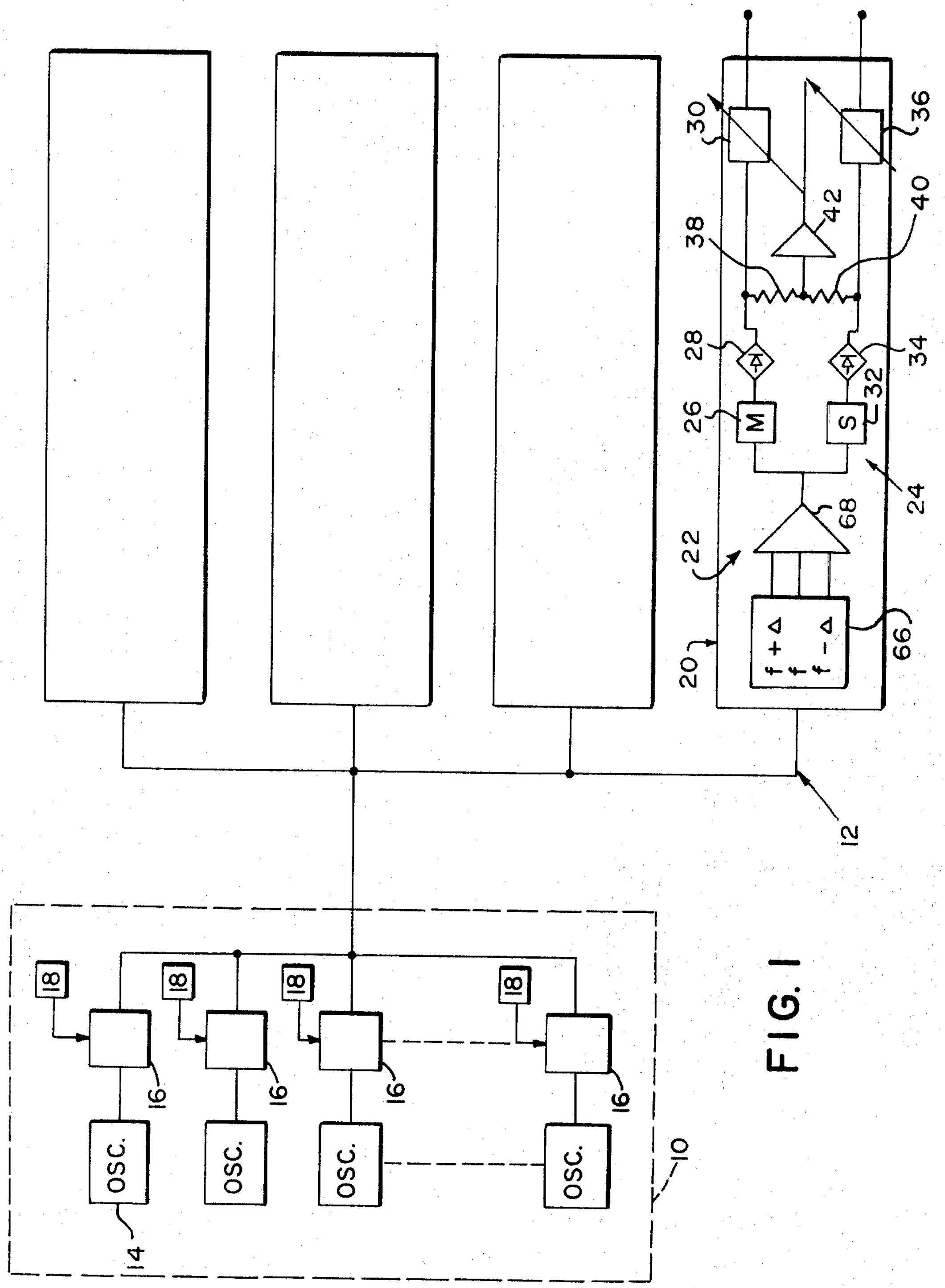

INVENTOR.
Philip L. Epstein
BY
Morse, Altman & Oates

TELEMETERING APPARATUS

CROSS REFERENCE TO RELATED APPLICATIONS

This application is a continuation of application Ser. No. 867,953; filed Oct. 20, 1969; for Telemetering Apparatus, now abandoned, which is a continuation of application Ser. No. 540,549; filed Apr. 6, 1966; for Telemetering Apparatus, now abandoned. The present invention relates to telemetering receivers and, more particularly, to telemetering receivers constituting part of a telemetering system in which each of a plurality of carrier or subcarrier bands is modulated by frequency shifts, involving two or three distinct frequencies, that represent digital information. Generally the upper, middle and lower frequencies or "tones" are designated mark, center and space, respectively. This form of telemetering is useful because the transmission and reception of such signals are characterized by excellent signal-to-noise ratio. In a two frequency receiver of the foregoing type, there are two discriminating channels, one tuned to mark frequency and the other tuned to space frequency, the frequency that predominates controlling the output. In a three frequency receiver of the foregoing type, there are two discriminating channels also, but if neither the mark frequency nor the space frequency predominates, the center tone predominates and assumes an error controlling function. In any determination of whether the mark frequency or space frequency predominates it is necessary that the mark and space channels be properly adjusted relative to eachother. Difficulties have been encountered in adjusting and maintaining desired predetermined relationships in the mark and space channels.

The primary object of the present invention is to provide, in a telemetering system of the foregoing type, a receiver in which the mark and space channels are interrelated electronically, by applying to the so-called threshold of each channel a control signal that represents an average of the intensities of mark and space input signals. An advantage of the foregoing circuitry is noise immunity, which results from raising or lowering the thresholds of both frequency channels in response to noise generated at any place in the system. Other objects of the present invention are to prevent error: by deactuating the receiver almost instanteously upon generation of a noise level at which the mark and space frequency cannot be distinguished; and by reactuating the receiver relatively slowly following disappearance of such a noise level in order to prevent premature operation.

Other objects of the present invention will in part be obvious and will in part appear hereinafter.

Figure 2:
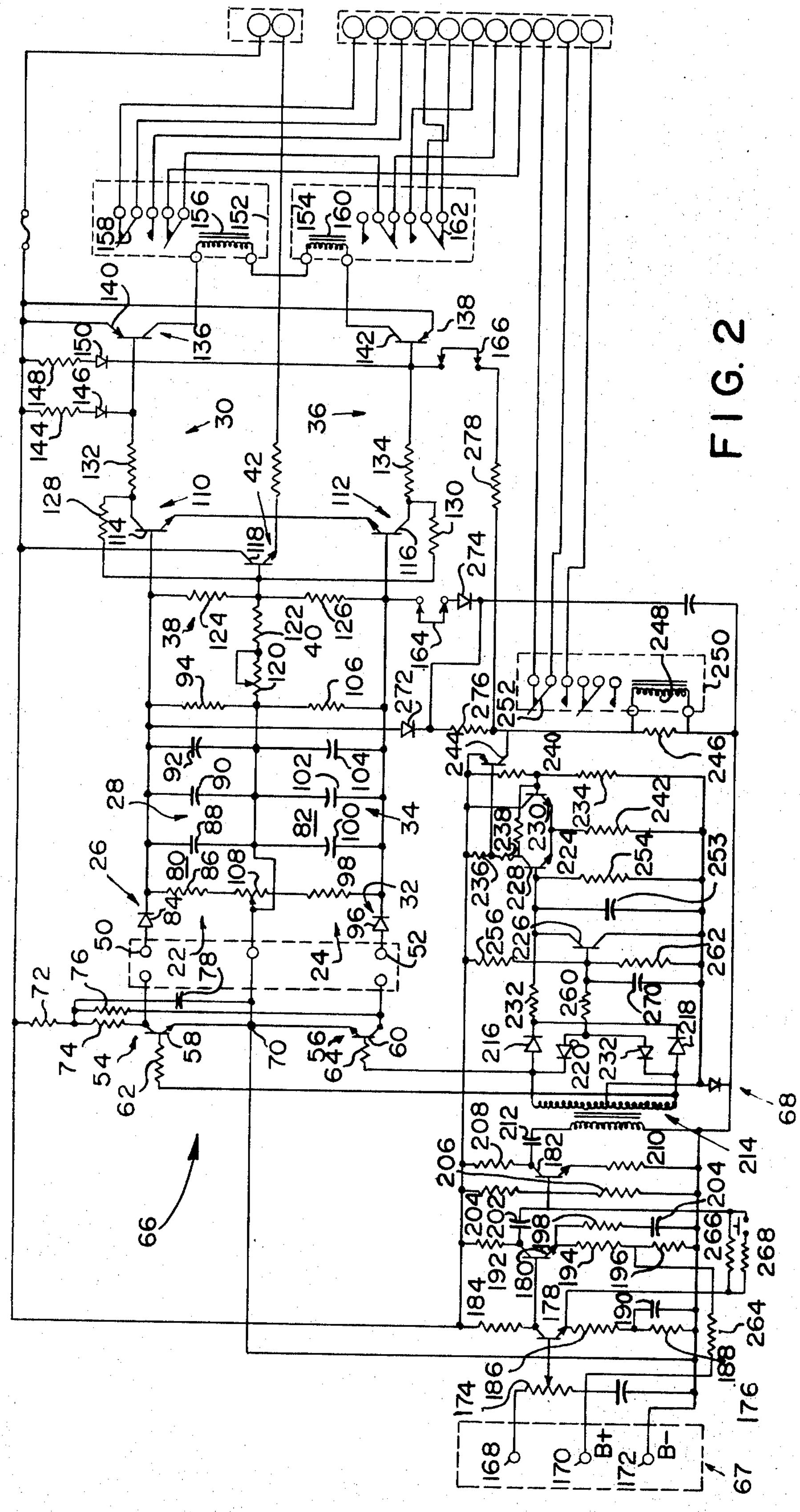

The invention accordingly comprises the telemetering receiver possessing the combination of elements, which are exemplified in the following detailed disclosure, the scope of which will be indicated in the appended claims. For a fuller understanding of the nature and objects of the present invention, reference should be had to the following detailed description, taken in connection with the accompanying drawing, wherein:

FIG. 1 is a block diagram of a telemetering system embodying the present invention; and FIG. 2 is an electrical schematic of the receiver of the system of FIG. 1.

Generally the system of FIG. 1 comprises a telemetering transmitter 10 and a telemetering receiver 12, connected by a suitable telephone line or the like for the transmission of carrier frequencies, each capable of mark center and space shifts. It will be understood that in a corresponding radio telemetry system, the line is replaced by a primary carrier frequency, which is subject to modulation by subcarrier frequencies, each capable of mark, center and space shifts. Transmitter 10 is shown as comprising a plurality of transmitter subsystems, each including an oscillator 14 and a modulator 16, the latter being under the control of a suitable digital input 18, by which the mark and space frequencies are selected. Receiver 12 comprises a plurality of receiver subsystems 20, each shown as including two channels 22, 24 for mark and space frequencies respectively. Channel 22 is shown as comprising a discriminator 26, a rectifier 28 and a threshold detector 30. Channel 24 is shown as including a discriminator 32, a rectifier 34 and a threshold detector 36. Without more, channels 22 and 24 would be of conventional design. However, in accordance with the present invention, the outputs of rectifiers 28, 34 are applied across a pair of resistors 38, 40 for drawing an amplifier 42 that controls the threshold levels of detectors 30, 36. The outputs of detectors 30, 36 are capable of controlling a two state relay. Also part of subsystem 20 are filter circuitry 66 and limiting amplifier circuitry 54, 56, 68, be described below. Details of detector subsystem 20 are shown in FIG. 2, now to be described.

As shown, input mark and space frequencies are applied at 50, 52, respectively, to discriminator 66, which directs the mark and space frequencies into their two channels 22, 24. For reasons to be described below, these two channels are controlled by a pair of limiting amplifiers 54, 56. Amplifiers 54, 56 comprise transistors 58, 60, the bases of which are resistance coupled, as at 62, 64 to a carrier detector circuit 68. The emitters of transistors 56, 58 are connected at 70. The outputs of transistors 58, 60 are developed across a resistance divider 72, 74, 76, the latter two resistors being shunted by a bypass capacitor 78. The outputs of transistors 58, 60 are applied by their collectors to mark and space rectifiers 80, 82. Rectifier 80 includes an input diode 84 and a resistor-capacitor filter 86, 88, 90, 92, 94. Rectifier 82 includes a diode 96, and a resistor-capacitor filter 98, 100, 102, 104, 106. A resistor 108 is connected between resistors 86, 98 in order to balance the effect of rectifiers 80, 82.

The outputs of rectifiers 80, 82 are applied to the bases of a pair of threshold detectors 110, 112. Threshold detectors 110, 112 include transistors 114, 116, the bases of which receive the output signals from rectifiers 80, 82. The emitters of transistors 114, 116 are commonly coupled to the emitter of a threshold adjusting transistor 118, the base of which is biased through an adjustable resistor divider 120, 122. In accordance with the present invention, the mark and space signals are applied to the bases of transistors 114, 116 across a pair of averaging resistors 124, 126. By virtue of these averaging resistors, threshold adjusting transistor 118 operatively controls both threshold detectors 110, 112.

The collectors of transistors 114, 116 are biased by resistors 128, 130 and resistively coupled at 132, 134 to output amplifiers 136, 138. Amplifiers 136, 138 are in the form of transistors 140, 142, the bases of which are connected to resistors 132, 134 and are biased by resistor-diode series pairs 144, 146 and 148, 150. The collectors of amplifiers 136, 138 apply the outputs of these amplifiers to a pair of relays 152, 154. Relay 152 includes a solenoid 158 which controls a double-pole, double-throw switch 158 and relay 154 includes a solenoid 160 which controls a double-pole, double-throw switch 162. Switches 158, 162 are interconnected so that either the mark or the space frequency predominates. Thus predominance of a mark frequency pulse is indicated by actuation of switch 158 and predominance of a space frequency pulse is indicated by actuation of switch 162.

The center or carrier frequency can be detected or not in accordance with conditions of switches at 164, 166. When switch 164 is open and switch 166 is closed, the circuit is in condition for two state operation. When switch 164 is closed and switch 166 is open, the circuit is in condition for three state operation in response to the output of filter 67, which has terminals 168, 170, 172. As shown, the signal is applied at input terminal 168, being coupled by a resistor and capacitor in series between terminal 168 and bias terminal 172. The signal is applied to a three stage amplifier comprising a first transistor 178, a second transistor 180 and a third transistor 182. The signal at resistor 174 is adjustably applied to the base of transistor 178 The collector of transistor 178 applies its output signal to the base of transistor 80, and the collector of transistor 80 applies its output signal to the base of transistor 182. Transistor 178 is biased by resistors 184, 186 and 188, the latter resistor being bypassed by a capacitor 190. Transistor 180 is biased by resistors 192, 194, 196, the latter two resistors being bypassed by a resistor 198 and a capacitor 200, in series. A capacitor resistor connection 202, 204, 206 couples the emitter of transistor 180 to the base of transistor 182. Transistor 182 is biased by resistors 208, 210. The output of the third stage of the amplifier is applied through a capacitor 212 to the primary of a coupling inductor 214. The opposite terminals of the secondary of inductor 214 apply their outputs to the bases of limiting amplifiers 54, 56, as above.

Carrier circuit 68 now to be described determines whether a correct signal is being received. If the line breaks down or the carrier frequency drops out, the carrier detector can sound an alarm or can lock the above described mark and space channels into predetermined condition. Generally if a channel fails, it is desirable to prevent noise from operating the receiver. In order to prevent noise from operating the receiver, it is desirable to provide a fast drop out in the event that the signal should disappear. Also in order to prevent premature operation following failure, it is desirable that the receiver pick up slowly to ensure that elimination of the failure is complete. For the foregoing purposes, rectifying diodes 216, 218 and 220, 222 serve to apply a direct current output across a differential amplifier 224 and a gate 226. Differential amplifier 224 includes two transistors 228, 230, the bases of which are coupled to secondary transformer 214 through resistors 232, 234. These transistors are suitably biased by resistors 236, 238, 240 and 242. The differential amplifier has sufficiently high gain to produce a very great response to a sudden change in input. The resulting signal is applied to the base of an output amplifier 244 which is coupled across a resistor 246 to an output solenoid 248 of a relay 250. Switches 252 of relay 250 are opened in response to the signal produced by output amplifier 244 and do not return to closed position until a predetermined time has elapsed following removal of the applied signal from the differential amplifier. The delay is effected by discharge of a capacitor 253 through resistor 254. Suitable resistors 256, 260, 262, 264, 266, 268 serve to provide suitable bias potentials for the circuit, a bypass capacitor 270 being provided across resistor 262. Suitable coupling diodes 272, 274 and resistors 276 and 278 serve to complete the components of the circuit by which the two state operation or the three state operation is selected.

In operation, the two state or three state condition of the circuit is selected by actuating switch 164 an deactuating switch 166 or vice versa. Thereafter balance resistors 124, 126 provide an average output for the bases of threshold detectors 110, 112, by which these threshold detectors are interrelated. Also, with the carrier detector fully operative, a sufficiently intense noise causes differential amplifier 224 to actuate relay 248 and the slow discharge of capacitor 253 ensures sufficient time before recovery for the noise to completely dissipate. The pressure or absence of a signal at either relay 156 or relay 160 is indicative of the reception of the mark or space signal. Bias is achieved by B+ and B− terminals as shown in FIG. 2.

The present invention thus provides a novel telemetering receiver which is capable of handling incoming noise with improved efficacy. Since certain changes may be made in the foregoing disclosure without departing from the scope of the invention herein involved, it is intended that all matter shown in the accompanying drawing or described in the foregoing specification be interpreted in an illustrative and not in a limiting sense.

WHAT IS CLAIMED IS:

1. A telemetering receiver comprising a mark channel a space channel and a carrier channel, said mark channel including a first limiting amplifier, a first discriminator operatively connected to said first limiting amplifier for selecting mark frequency signal from an input multiple frequency signal, a mark channel rectifier operatively connected to said first discriminator for converting said mark frequency signal to a mark direct current signal, and a first threshold detector operatively connected to said mark channel rectifier and responsive to said mark direct current signal, said space channel including a second limiting amplifier a second discriminator for selecting a space frequency signal from an input multiple frequency signal, a space channel rectifier for converting said space frequency signal to a space direct current signal, and a second threshold detector operatively connected to said space channel rectifier and responsive to said space direct current signal, a pair of serially connected resistor means connected between an output of said mark channel rectifier and an averaging amplifier having an input connected to a junction of said resistor means, an output of said averaging amplifier constituting a control signal representing an average of the intensities of said mark direct current signal and said space direct current signal, an output of said averaging amplfier operatively connected to said first and second threshold detectors for controlling the threshold level of said threshold detectors, said carrier channel responsive to an input carrier signal, including a differential amplifier and a gate, said input carrier signal coupled to said differential amplifier through a transformer having primary and secondary windings, said secondary winding operatively connected to an input said differential amplifier, said gate operatively connected to said first and second limiting amplifiers said differential amplifier operatively connected to said gate, a capacitor operatively connected between said differential amplifier input and a center tap of said secondary winding, said differential amplifier being energized into a conducting state by a sudden change in a signal at said differential amplifier input, a control signal generated by said differential amplifier when in the conducting state being applied to said gate, said capacitor operating to maintain said differential amplifier in a conducting state for a time period related to the discharge time constant of said capacitor, said gate being responsive to said control signal for locking said mark and space channels into predetermined condition.

2. The telemetering apparatus as claimed in claim 1 including relay means having solenoid and switch means, said solenoid means operatively connected to said differential amplifier, said solenoid means being energized by said control signal generated by said differential amplifier, said switch means having opened and closed positions, said switch means being in said opened position when said solenoid means is energized and in said closed position when said solenoid means is deenergized, said switch means returning to said closed position from said opened position a predetermined period of time after said signal at the input of said differential amplifier returns to its initial condition, said predetermined period of time defined by said discharge time of said capacitor.

3. The telemetering apparatus as claimed in claim 2 wherein said differential amplifier includes first and second transistors, said capacitor connected directly to the base of said first trans-istor and resistively connected to the emitters of said first and second transistors, the base of said second transistor resistively connected to the collector of said first transistor, the collector of said first transistor operatively connected to said solenoid means.

* * * * *